US007065992B2

(12) United States Patent
Talukdar et al.

(10) Patent No.: US 7,065,992 B2
(45) Date of Patent: Jun. 27, 2006

(54) ROTARY PAWL LATCH WITH LOCK DOWN PADDLE

(75) Inventors: Robin Talukdar, Wilmington, DE (US); Gert Berg, La Croix St Ouen (FR)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 10/923,343

(22) Filed: Aug. 21, 2004

(65) Prior Publication Data

US 2005/0115289 A1 Jun. 2, 2005

Related U.S. Application Data

(60) Provisional application No. 60/497,230, filed on Aug. 22, 2003.

(51) Int. Cl.
*B60R 25/02* (2006.01)

(52) U.S. Cl. .............. 70/208; 292/336.3; 292/DIG. 31; 70/379 R

(58) Field of Classification Search .................. 70/208, 70/209–211, 257, 379 R, 380; 292/336.3, 292/DIG. 31

See application file for complete search history.

(56) References Cited

U.S. PATENT DOCUMENTS

| | | | | |
|---|---|---|---|---|
| 4,510,779 | A * | 4/1985 | Ahad | 70/208 |
| 4,683,736 | A * | 8/1987 | Weinerman et al. | 70/208 |
| 4,969,916 | A * | 11/1990 | Weinerman et al. | 70/208 |
| 4,989,907 | A * | 2/1991 | Edmonds et al. | 292/223 |
| 5,098,141 | A * | 3/1992 | Bull | 292/252 |
| 5,104,171 | A * | 4/1992 | Johnsen et al. | 296/50 |
| 5,927,772 | A | 7/1999 | Antonucci | 292/336.3 |
| 5,987,943 | A * | 11/1999 | Verga et al. | 70/208 |
| 6,048,006 | A | 4/2000 | Antonucci | 292/336.3 |
| 6,209,366 | B1 * | 4/2001 | Zagoroff | 70/208 |
| 6,327,879 | B1 | 12/2001 | Malsom | 70/97 |
| 6,406,075 | B1 * | 6/2002 | Rice et al. | 292/336.3 |
| 6,427,501 | B1 * | 8/2002 | Ramsauer | 70/208 |
| 6,427,502 | B1 * | 8/2002 | Zagoroff | 70/208 |
| 6,513,354 | B1 * | 2/2003 | Predd et al. | 70/208 |
| 6,530,250 | B1 * | 3/2003 | Linares et al. | 70/208 |
| 6,546,764 | B1 * | 4/2003 | Segawa | 70/208 |
| 6,730,867 | B1 | 5/2004 | Hyp | 200/318 |
| 6,840,552 | B1 * | 1/2005 | Ramsauer | 292/336.3 |
| 2002/0152778 | A1 * | 10/2002 | Segawa | 70/208 |
| 2004/0074267 | A1 * | 4/2004 | Linares | 70/208 |

FOREIGN PATENT DOCUMENTS

| | | |
|---|---|---|
| GB | 2379244 B | 5/2004 |

* cited by examiner

*Primary Examiner*—Suzanne Dino Barrett
(74) *Attorney, Agent, or Firm*—Paul & Paul

(57) ABSTRACT

A latch assembly for releasably securing a first member in a closed position relative to a second member is disclosed. The latch assembly includes a housing, a handle, and a lock barrel. The housing is adapted for attachment to one of the first member and the second member. The handle is pivotally attached to the housing and is movable between a closed position and an open position. The handle causes the latch assembly to open when the handle is moved to the open position. The lock barrel is supported by the handle. The lock barrel is adapted for being selectively rotated between locked and unlocked positions by a user using a key. The lock barrel has two projections that are positioned to interfere with and substantially prevent the movement of the handle to the open position when the lock barrel is in the locked position.

21 Claims, 14 Drawing Sheets

FIG. 7
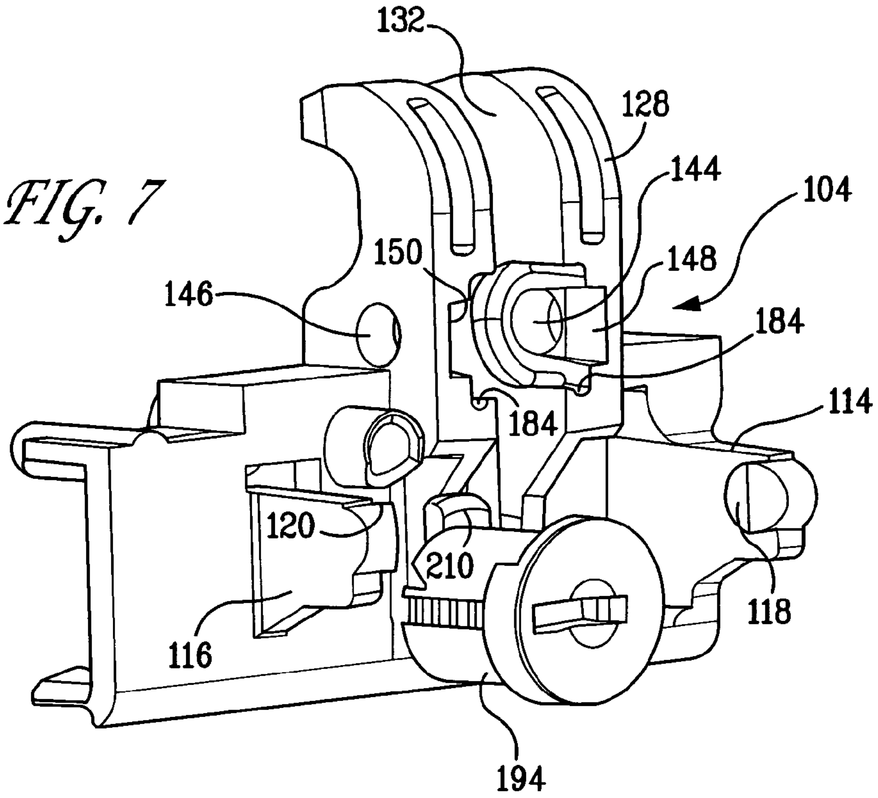
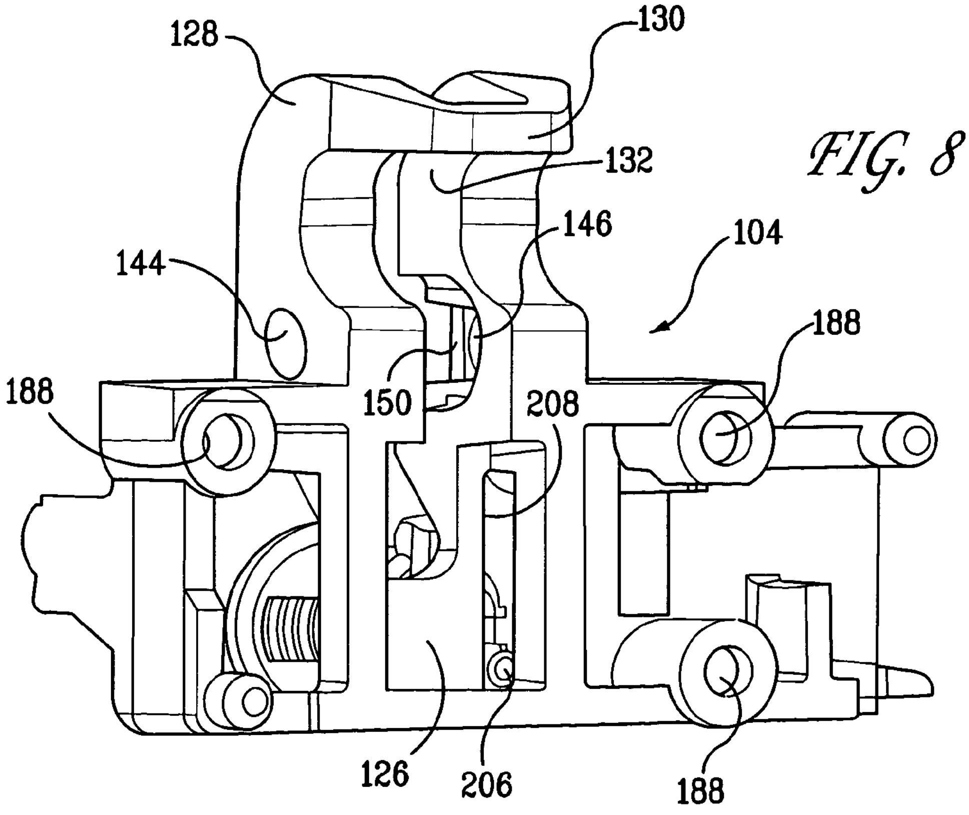
FIG. 8

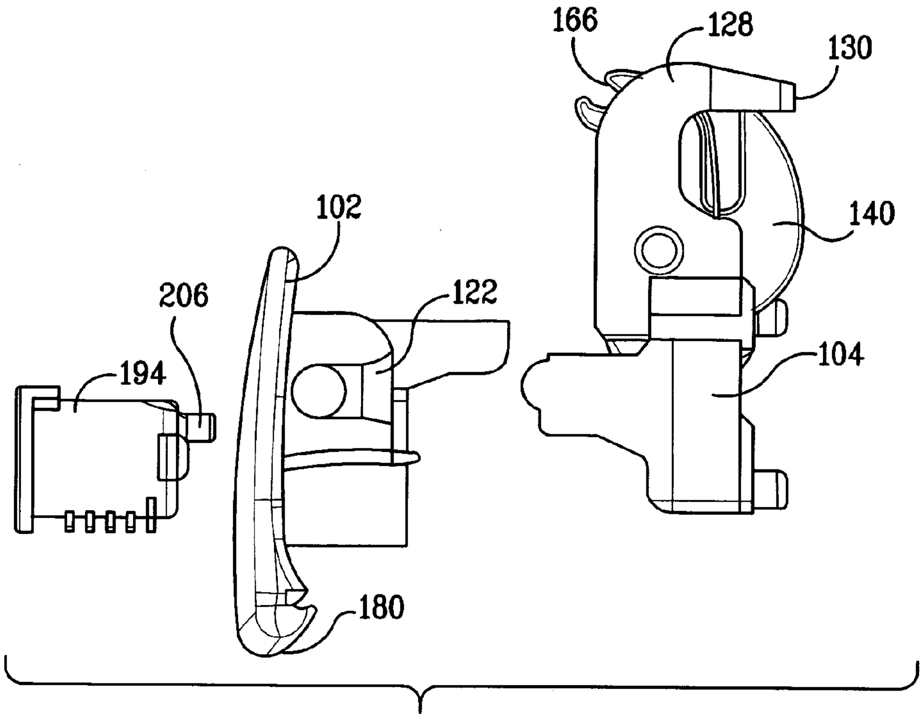
FIG. 14
FIG. 15
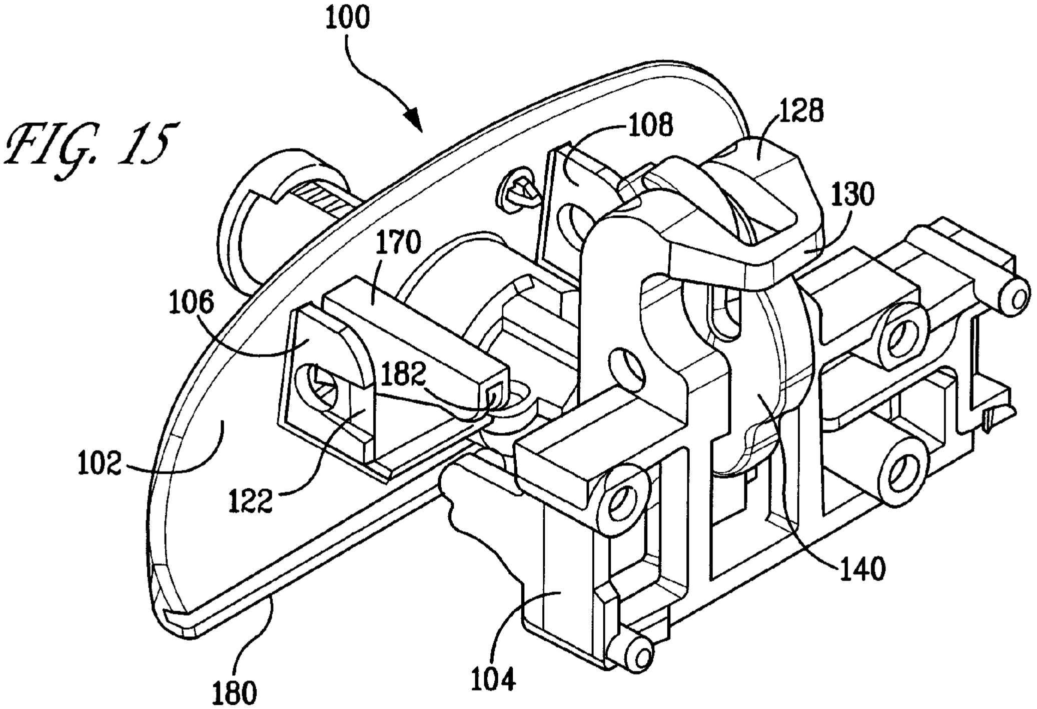

ROTARY PAWL LATCH WITH LOCK DOWN PADDLE

CROSS REFERENCE TO RELATED APPLICATIONS

This application claims the benefit of the priority of U.S. Provisional Application for Patent Ser. No. 60/497,230, filed on Aug. 22, 2003, the entirety of which is incorporated herein by reference.

BACKGROUND OF THE INVENTION

1. Field of Invention

The present invention relates to the field of latch assemblies.

2. Brief Description of the Related Art

Latch assemblies are relied on in many applications for securing items, such as panels, doors, and doorframes together. For example, containers, cabinets, closets, compartments and the like may be secured with a latch. An important use for latches is in the automotive field, where there is a desire and need to access automotive compartments, such as, for example, the trunk or passenger compartments of vehicles, as well as interior compartments such as a glove box. Various latches for panel closures have been employed where one of the panels such as a swinging door or the like is to be fastened or secured to a stationary panel, doorframe, or compartment body. Although many latch assemblies are known in the prior art, none are seen to teach or suggest the unique features of the present invention or to achieve the advantages of the present invention.

SUMMARY OF THE INVENTION

The present invention is directed to a latching system for securing two members together. The present invention includes a housing, a rotary pawl, catch means for releasably holding the pawl in a closed configuration, and means for operating the catch means. The pawl is pivotally attached to the housing and is rotationally movable between a closed or engaged configuration and an open or disengaged configuration. The pawl is provided with a torsion spring member that biases the pawl toward the open or disengaged configuration. The catch means includes a locking member that is movable between an undeflected or relaxed position and a deflected position and is resilient such that the locking member is biased toward the relaxed position by its own internal spring force. The locking member can be deflected to the deflected position by the action of the means for operating the catch means, which in the illustrated examples is a handle pivotally supported by the housing. When the pawl strikes a keeper during closing, the pawl is moved to the closed configuration. A lug projecting from the pawl is engaged by the locking member once the pawl is in the closed configuration in order to keep the pawl in the closed configuration. At this time the pawl and a portion of the housing cooperatively capture the keeper to secure the latch to the keeper. Actuating the handle by rotating it to the open position deflects the locking member out of engagement with the lug projecting from the pawl, which allows the pawl to rotate under the force of a torsion spring to the open configuration. Thus, the latch can be disengaged from the keeper and a compartment, for example, can be opened. The handle is provided with a housing or receptacle for a lock barrel or lock plug. A lock barrel is supported by the receptacle in the handle such that the lock barrel can be selectively rotated between locked and unlocked positions by a user using an appropriate key. The lock barrel has two projections that are positioned to interfere with and substantially prevent the movement of the handle to the open position when the lock barrel is in the locked position. Thus, the lock barrel can be used to selectively lock the rotary pawl latch against opening.

BRIEF DESCRIPTION OF THE DRAWINGS

FIGS. 7–8 are views of the rotary pawl latch with the handle hidden to reveal the lock barrel shown in the locked position.

FIGS. 12–15 are partial exploded views of the rotary pawl latch according to the present invention showing the handle and the lock barrel separated from the rest of the latch.

DETAILED DESCRIPTION OF THE INVENTION

Figure 1:
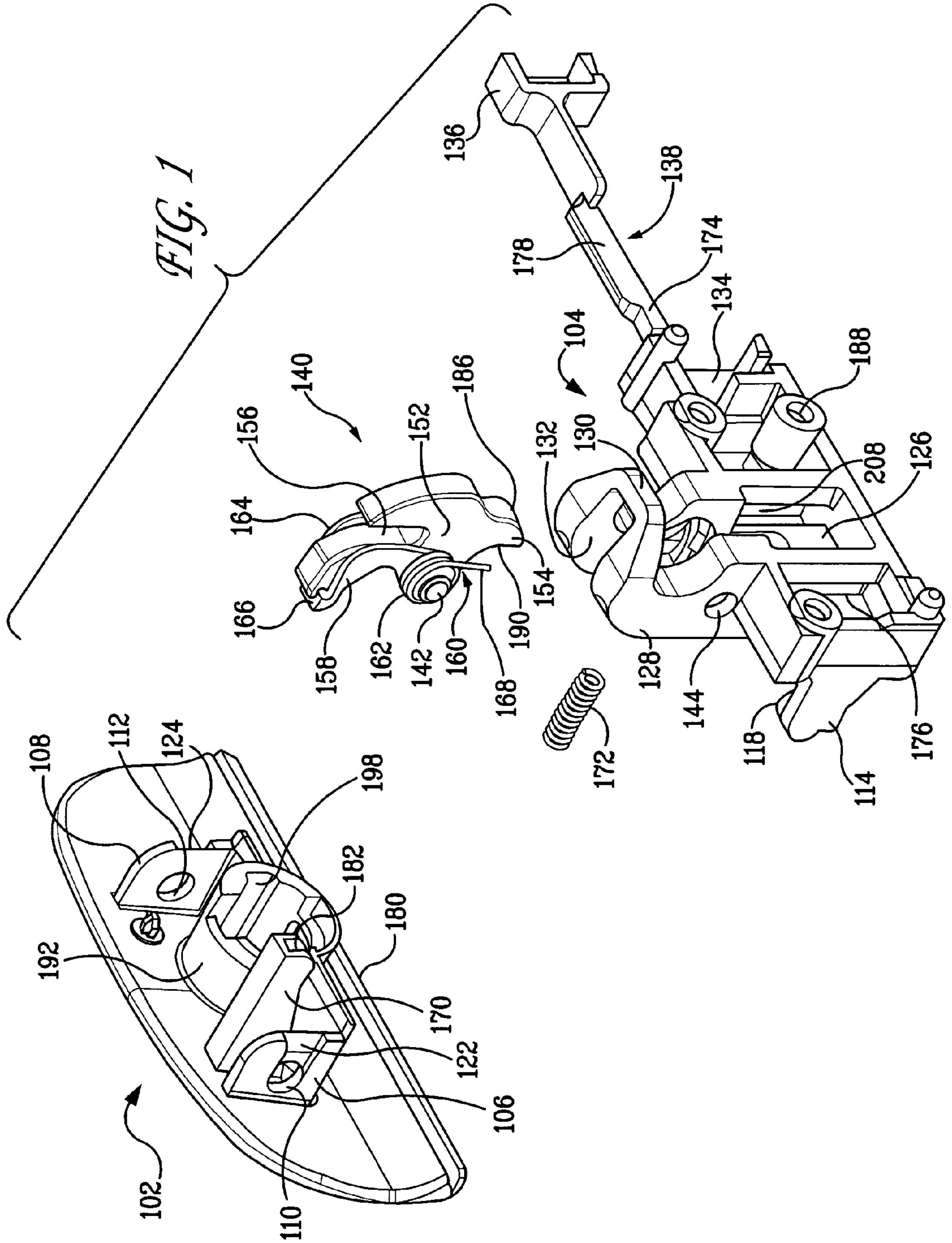
FIG. 1 is an exploded view of the rotary pawl latch according to the present invention shown without the lock barrel.
Figure 3:
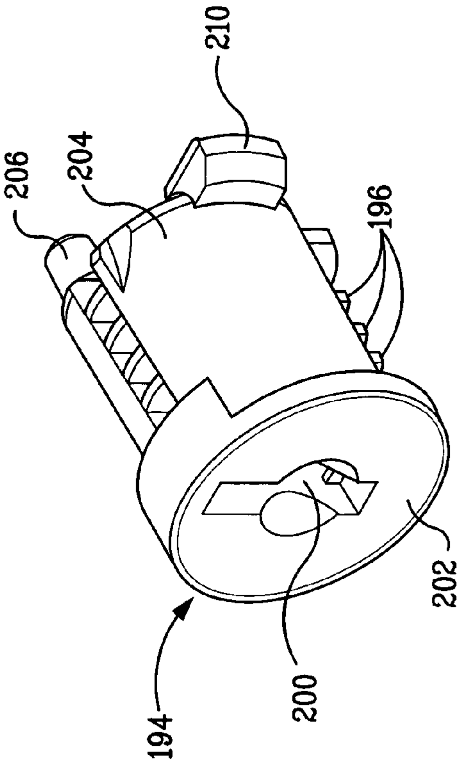
FIGS. 2–6 are views of the lock barrel of the rotary pawl latch according to the present invention.
Figure 6:
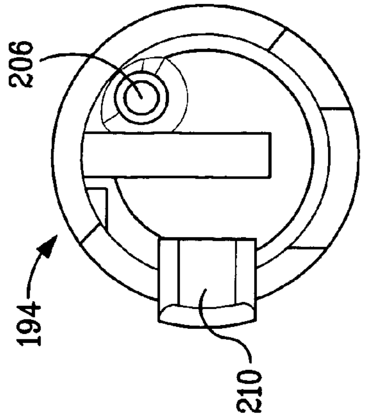
Figure 5:
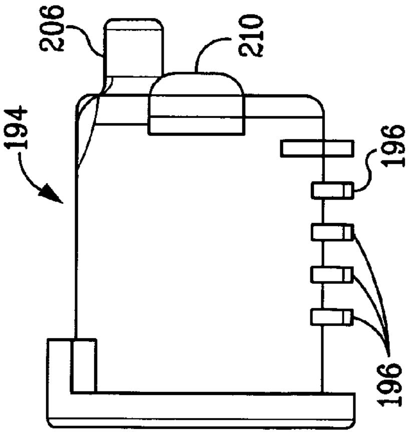
Figure 2:
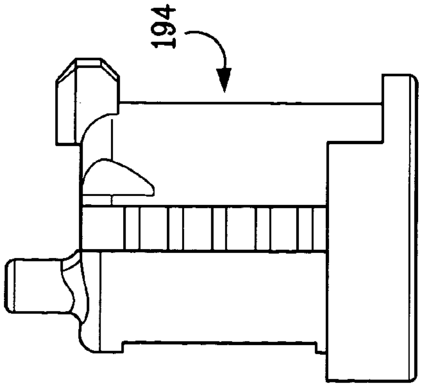
Figure 4:
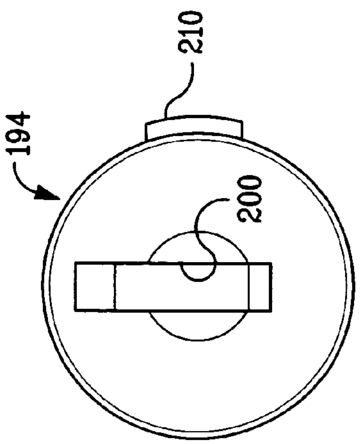
Figure 9:
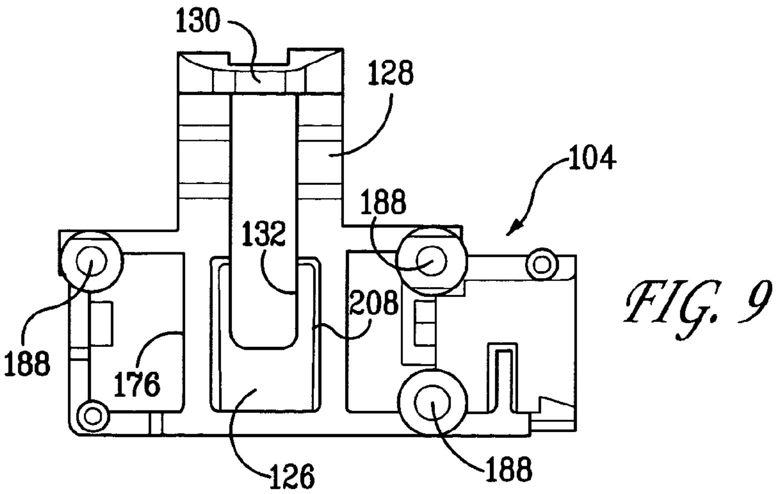
FIG. 9 is a rear view of the housing of the rotary pawl latch according to the present invention.
Figure 10:
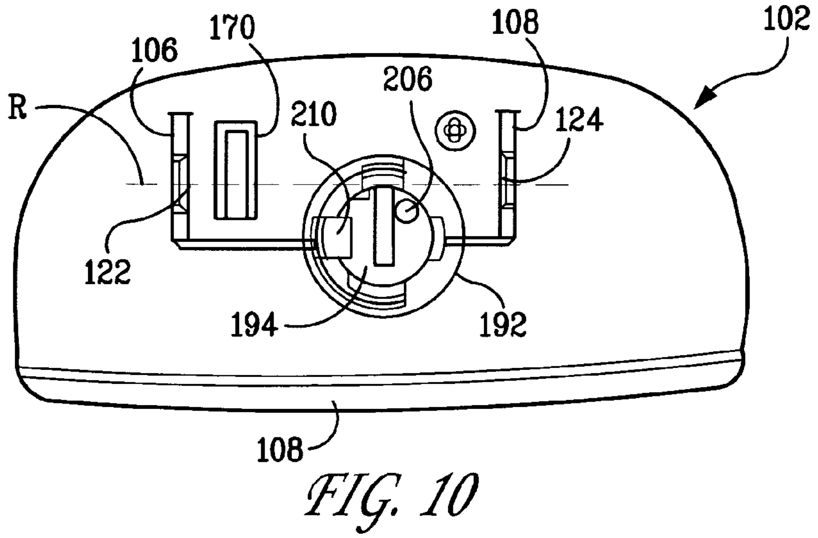
FIG. 10 is a rear view of the handle of the rotary pawl latch according to the present invention showing the lock barrel in the unlocked position.
Figure 11:
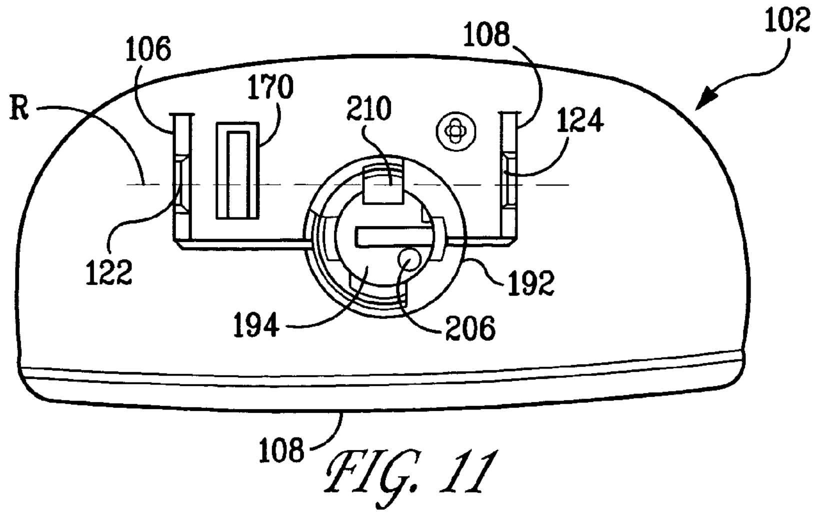
FIG. 11 is a rear view of the handle of the rotary pawl latch according to the present invention showing the lock barrel in the locked position.
Figure 12:
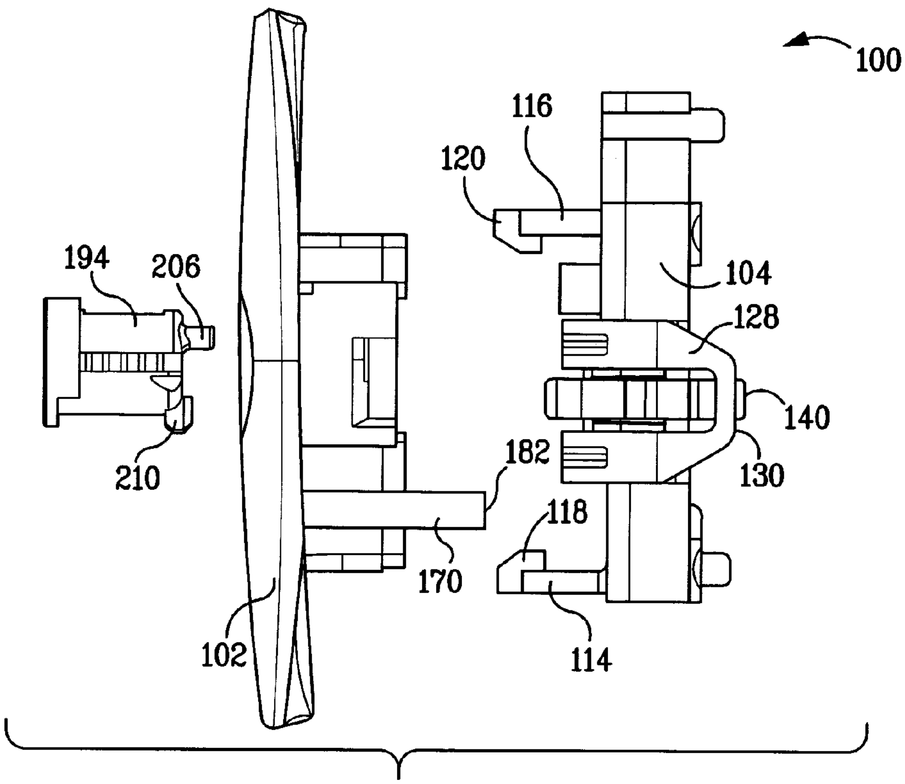
Figure 13:
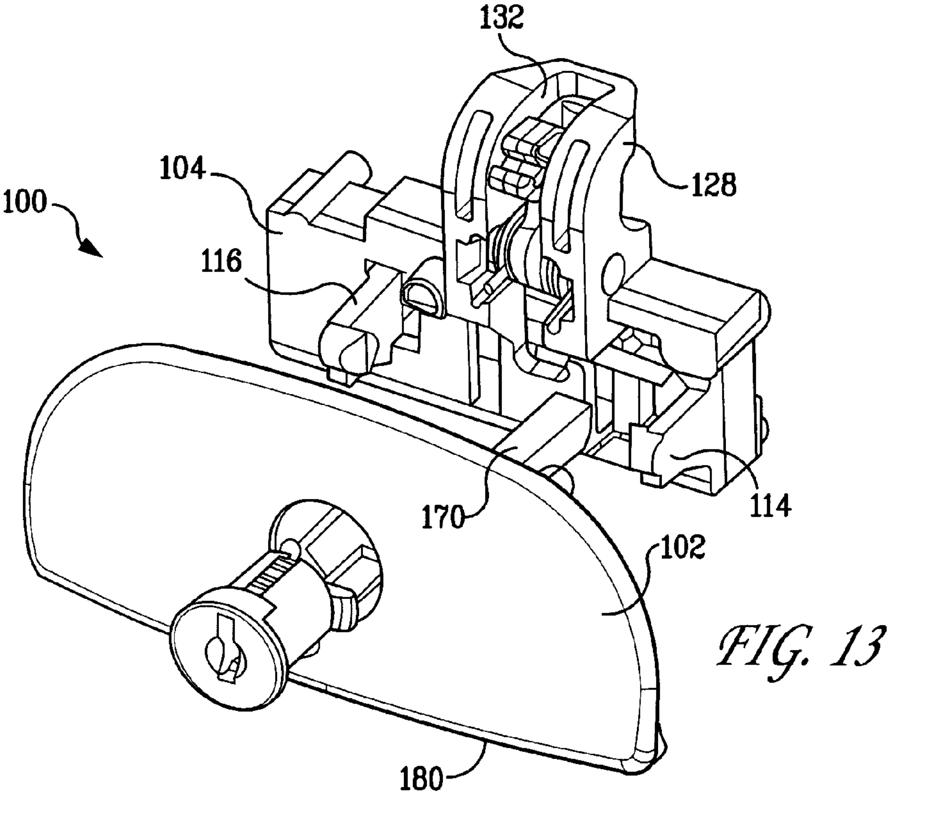
Figure 16:
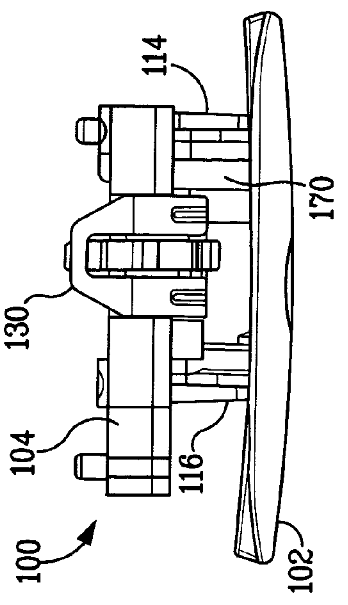
FIGS. 16–20 are views of the rotary pawl latch according to the present invention showing the handle and the pawl in closed positions.
Figure 17:
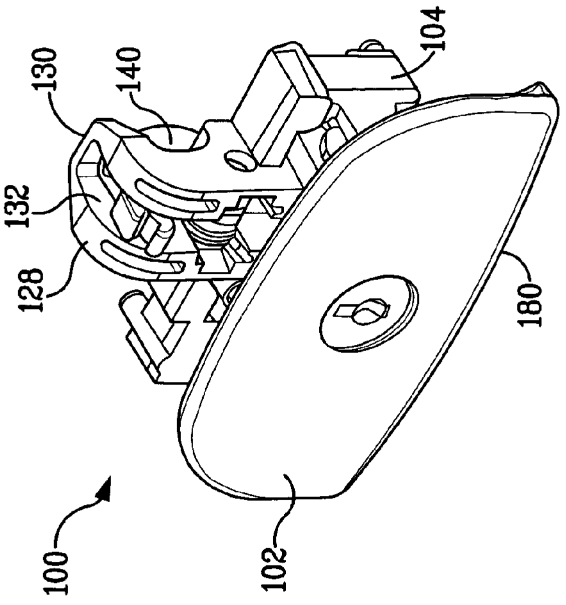
Figure 18:
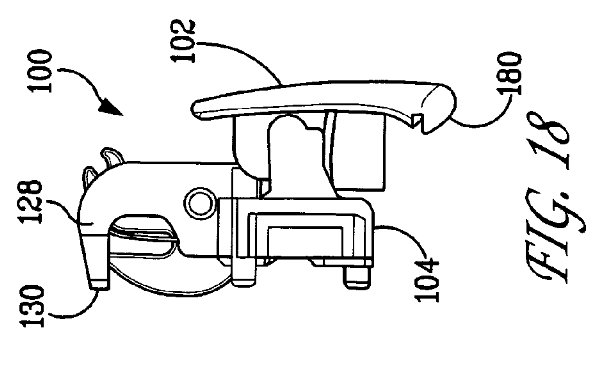
Figure 19:
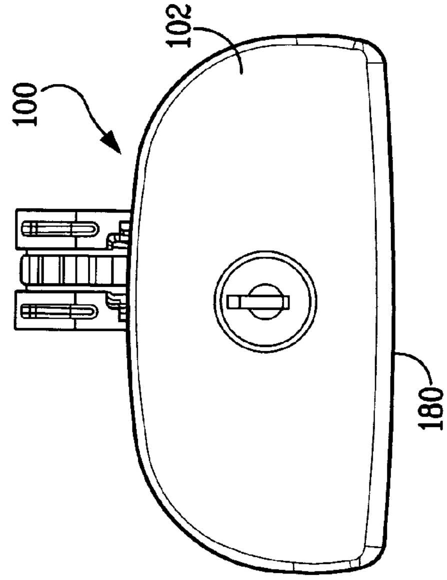
Figure 20:
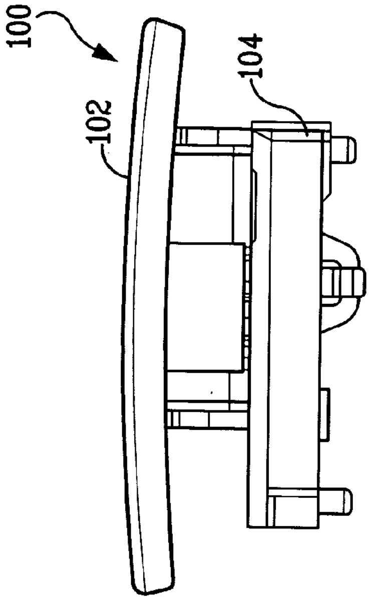
Figure 21:
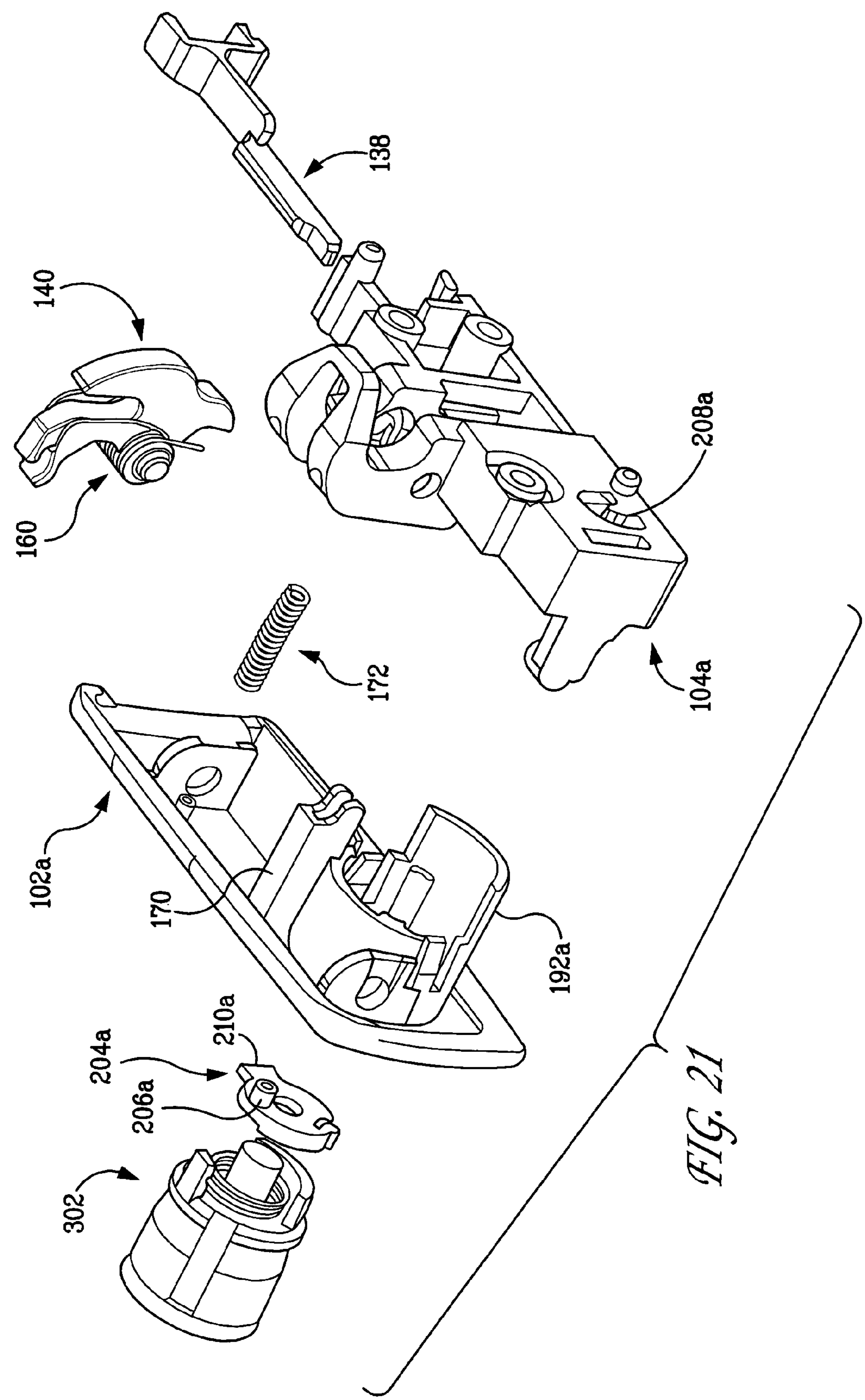
FIG. 21 is an exploded view of a second embodiment of the rotary pawl latch according to the present invention.
Figure 22:
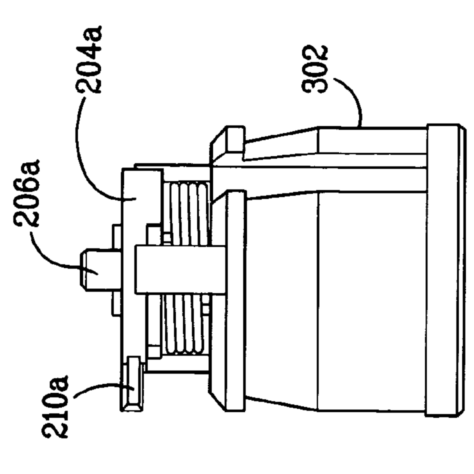
FIGS. 22–26 are views of the lock barrel assembly of the second embodiment of the rotary pawl latch according to the present invention.
Figure 23:
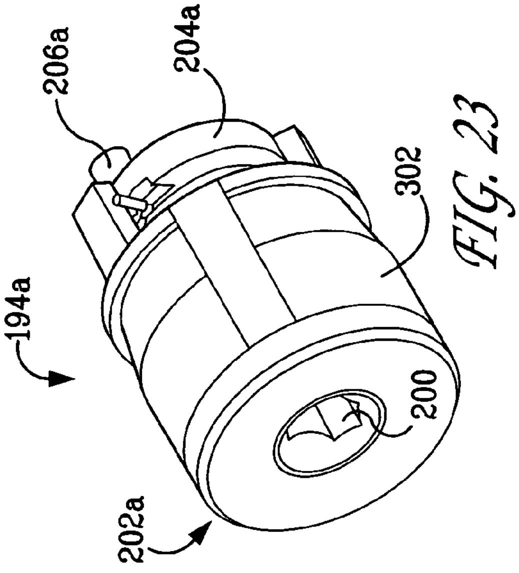
Figure 24:
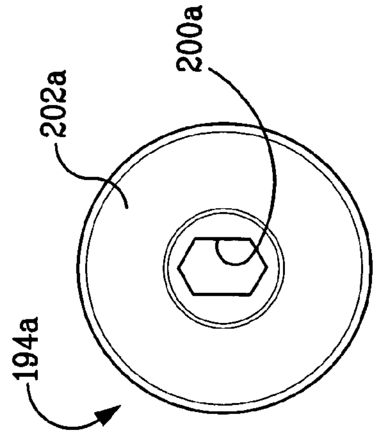
Figure 25:
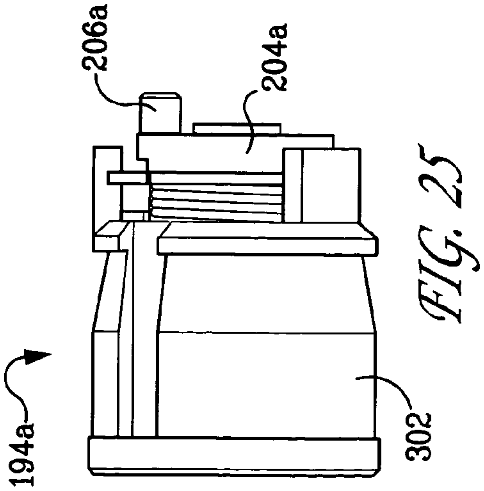
Figure 26:
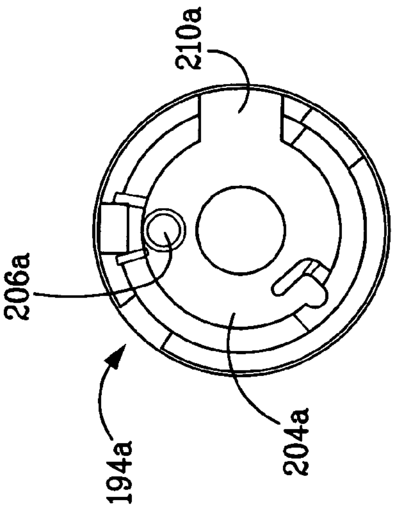
Figure 27:
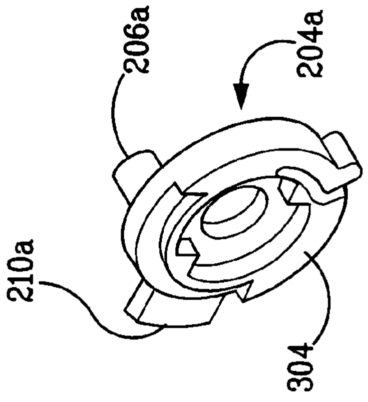
FIG. 27 is an isometric view of end attachment of the lock barrel assembly of the second embodiment of the rotary pawl latch according to the present invention.

The latches disclosed herein are similar in operation to the latches disclosed in U.S. Pat. No. 5,927,772, issued on Jul. 27, 1999, U.S. Regular Utility patent application Ser. No. 10/001,479, filed on Nov. 1, 2001, U.S. Provisional Patent Application No. 60/245,089, filed on Nov. 1, 2000, U.S.

Provisional Patent Application No. 60/254,605, filed on Dec. 10, 2000, U.S. Provisional Patent Application No. 60/273,944, filed on Mar. 7, 2001, U.S. Provisional Patent Application No. 60/318,839, filed on Sep. 13, 2001, and U.S. Provisional Patent Application No. 60/312,677, filed on Aug. 15, 2001, all of which are incorporated herein by reference in their entirety.

Referring to FIGS. 1–20, a latch 100 made in accordance with the present invention can be seen. The latch 100 includes a latch housing 104, a pawl 140, a locking member 138, and means for selectively moving the locking member in and out of engagement with the pawl. In the illustrated embodiment, a handle 102 having an actuation arm 170 is provided for selectively moving the locking member 138 in and out of engagement with the pawl 140.

The latch 100 can be used for securing a first member relative to a keeper or a second member. The latch 100 is generally applicable wherever one or more closure members need to be secured in a certain position. Further, the member to which the latch 100 is attached can be movable or stationary. In addition, the latch 100 may be mounted in any orientation depending upon the particular application.

Preferably, the housing 104 has a portion that closes off the open end of the pawl slot 156 when the pawl 140 is in the closed configuration. This can be accomplished by providing for a portion of the housing 104 to obstruct the opening of the slot 156 when the pawl 140 is in the closed configuration. Furthermore, the housing must be adapted to allow an unobstructed path to the opening of the pawl slot 156 when the pawl 140 is in the open configuration.

Referring to FIGS. 1–20, the latch 100 of the present invention is substantially identical in operation to that disclosed in U.S. Pat. No. 5,927,772, which is incorporated herein by reference. In the interest of brevity, the description herein will be directed in large part to the distinctions between the latch of the present invention and that disclosed in U.S. Pat. No. 5,927,772.

The rotary pawl latch 100 has an actuating member, such as, for example, the handle or paddle 102 that is pivotally mounted to a latch housing 104. The handle 102 is provided with flanges 106 and 108 which have holes 110 and 112, respectively. The housing 104 is provided with suitable means for the attachment of the handle 102 such as flanges 114 and 116 respectively having projections 118 and 120 thereon. The projections 118 and 120 are received in holes 110 and 112, respectively, to pivotally attach the handle 102 to the housing 104. The material ahead of the holes 110 and 112 is progressively thinner so as to form ramps 122 and 124 which lead to the holes 110 and 112. The flanges 114 and 116 are resilient such that the handle 102 can be snap-fitted to the housing 104. With the handle 102 positioned relative to the housing 104 such that the projections 118 and 120 register with the ramps 122 and 124, respectively, the handle 102 can be pressed toward the housing 104 until the projections 118 and 120 snap into the holes 110 and 112, respectively. Thus the handle 102 is pivotally attached to the housing 104. While a snap-fit handle attachment means is shown in the illustrated embodiment, it is conceivable that other fastening means such as a pins, axles, bearings, and the like can also be employed. In addition it is possible for the positions of the holes 110 and 112 and the projections 118 and 120 to be reversed such that the projections 118 and 120 are provided on the handle 102 and the holes 110 and 112 are provided in the housing 104.

In the illustrated example, the housing 104 is provided with a body portion 126 having a hook-like member 128 projecting therefrom. Hook-like as used herein refers to any member that has a crook, curve, or bend to thereby catch on another member. The hook-like member or flange 128 has a tip 130 that points toward a keeper (not shown) as the member to which the latch 100 is attached is moved to the closed position. A first slot 132 is provided within the portion of the housing body 126 and extends through the hook-like member 128. The housing body 104 has a cavity 134 for receiving and holding the base 136, to which the locking member 138 is resiliently attached, in a positionally fixed relationship to the housing body 104.

The latch assembly 100 also includes a pawl 140 shown rotationally connected to the latch housing 104 with suitable attachment means such as the pawl pivot members 142 which are provided extending outwardly from the pawl 140 at opposite sides thereof. Only one of the pivot members 142 is shown, the other being a mirror image. The pivot members 142 can also be provided as a single pivot member extending through the pawl 140. The pawl 140 is installed in the housing 104 by snap-fit placement of the pawl pivot members 142 into the pawl pivot recesses 144, 146 disposed in opposite sides of the slot 132. A pair of flared-out guide ramps 148, 150 are provided on either side of the slot 132 which lead to the recesses 144, 146. The guide ramps 148, 150 guide the pawl pivot members 142 in the direction of the pawl pivot recesses 144, 146 during the snap-fitting process.

The pawl 140 is provided having a body portion 152 with a pair of pawl pivot members 142 extending therefrom. The pawl 140 has a locking engagement portion or projection 154 and is provided with a pawl slot 156 to retain a keeper member when the latch 100 is used to hold a closure member in the closed position. For example, the keeper member (not shown) may be attached to a stationary panel or compartment at a position such that when a door to which the latch assembly 100 is attached is pivotally moved to the closed position, the keeper member will be positioned inside the crook or bend of the hook-like member 128. The pawl 140 is also shown having an arm portion 158 extending from the pawl body 152.

The latch assembly 100 also includes a pawl torsion spring 160 having two coiled portions 162. Only one coiled portion 162 is shown in FIG. 1, the second coiled portion being a mirror image of the first. The pawl torsion spring 160 is installed on the pawl 140 with each the coiled portions 162 surrounding a respective one of the pawl pivot members 142. The torsion spring 160 includes a wire loop 164 that engages the notch 166 in the arm portion 158. The wire loop 164 is joined to a respective coiled portion 162 at each end. Lateral arms of the wire loop 164 extend from the respective coiled portions 162 to the notch 166 with the pawl arm 158 being positioned at least in part intermediate the lateral arms of the wire loop 164. The torsion spring 160 also has two tail portions 168, only one of which is shown in FIG. 1 and the other being a mirror image thereof. The pawl 140 is installed with the notch 166 positioned behind the pawl slot 156 as seen by an observer when the tip 130 faces toward the observer. In the fully assembled latch, each of the two tail portions 168 of the torsion spring 160 rests on a respective step 184 formed in either side of the slot 132. With the tail portions 168 of the torsion spring 160 positioned along the steps 184, the wire loop 164 engaging the notch 166 exerts a force on the arm portion 158 of the pawl 140 that biases the pawl 140 toward the open or unlatched configuration.

The handle 102 has an actuation arm 170 that extends toward the housing 104. A coil spring 172 is provided intermediate the handle 102 and the housing 104 that biases the handle 102 toward the closed position.

The actuation arm 170 of the paddle 102 is provided to engage the actuator engaging end 174 of the locking member 138. The locking member 138 is provided to extend in front of the slot 176 in the housing body 104. At the end opposite the actuator engaging end 174 the locking member 138 is resiliently attached in cantilever fashion to the base 136 which is held in the cavity 134.

The actuating arm 170 extends through the slot 176 such that a portion of the actuating arm 170 is positioned over the actuator engaging end 174 of the locking member 138. The locking member 138 is also provided with a pawl engaging portion 178 which engages the projection 154 of the pawl 140. The latch assembly 100 is actuated by lifting the grasping edge 180 of the paddle 102 away from the housing 104. The end 182 of the actuating arm 170, distal from the paddle 102, engages the actuator engaging end 174 of the locking member 138 and the actuator engaging end 174 is deflected away from the axis of rotation of the pawl 140. By moving the handle 102 to the open position, the locking member 138 is deflected sufficiently far from the axis of rotation of the pawl 140 such that the pawl engaging portion 178 of the locking member 138 is moved out of engagement with the projection 154 thereby freeing up the pawl 140 for rotation to the open position. The bias provided by the pawl torsion spring 160 moves the pawl 140 from its closed position, where the keeper would be cooperatively captured by the pawl slot 156 and the hook-shaped flange 128, and forces the pawl 140 to rotate to the open position. The rotation of the pawl 140 to the open position brings the opening of the pawl slot 156 out from the portion of the slot 132 formed in the hook-shaped flange 128, such that the opening of the pawl slot is no longer obstructed by the hook-shaped flange 128. Thus, the keeper that was once captured in the pawl slot 156 may now be disengaged from the pawl 140. The closure member being secured by the latch 100 can then be opened. The keeper may be a U-shaped rod attached to the frame surrounding the closure member or to the compartment secured by the closure member. Furthermore, any like suitable member such as a bar, claw, or other suitable attachment member may serve as a keeper.

Suitable mounting means are provided to retain the latch assembly 100 on a panel or closure member. For example, installation of the latch assembly 100 to a panel may be accomplished with screws or pins which engage the holes 188 for fastening of the latch assembly to a closure member, such as for example, the door of the glove box of an automobile.

When the closure member to which the latch 100 is mounted is being closed, the opening of the pawl slot 156 faces toward the keeper and is unobstructed by the hook-like member 128. As the closure member is slammed shut, the keeper is received in the slot 156 and impacts the pawl 140 causing the rotation of the pawl 140 to the closed configuration illustrated in the drawings. As the pawl 140 rotates to the closed position, the ramped surface 186 cams the locking member 138 out of the way of the projection 154 so that the pawl 140 can rotate to the closed position under the force imparted to the pawl 140 by the keeper. Once the pawl 140 is in the closed position, the locking member 138 returns to its undeflected position due to its own internal spring forces and catches the flat side 190 of the projection 154 to keep the pawl 140 in the closed position illustrated in FIGS. 16–20, thus capturing the keeper in the pawl slot 156 and securing the closure member to which the latch 100 is mounted in the closed position.

The latch 100 is provided with means to lock down the handle 102 so as to prevent unauthorized access to the compartment secured by the latch 100. This is accomplished by providing a receptacle 192 as part of the handle 102. The receptacle 192 is adapted to receive a lock barrel 194. The lock barrel is adapted for being selectively rotated between locked and unlocked positions by a user using a key. The lock barrel is of a type having a series of wafers 196 that are normally biased to project from the lock barrel 194 and engage a recess or groove 198 in the receptacle 192 so as to prevent rotation of the lock barrel 194 relative to the receptacle 192 between the locked position illustrated in FIGS. 7, 8, and 11 and the unlocked position illustrated in FIG. 10. By inserting an appropriate key (not shown) in the key hole 200, the wafers 196 are retracted into the lock barrel 194 and the lock barrel can be rotated from the locked to the unlocked position.

In the illustrated example, the lock barrel 194 has two locking features for added resistance to tampering, but either feature alone can serve to substantially prevent the opening of the latch so as to provide a useful deterrent to the unauthorized opening of the latch. The lock barrel has a keyhole end 202, a locking engagement end 204, and a longitudinal axis about which the lock barrel 194 is rotated to move the lock barrel between locked and unlocked positions. The first locking feature includes a cylindrical projection 206 attached to the locking engagement end 204 of the lock barrel 194. The first projection 206 is offset relative to the longitudinal axis of the lock barrel such that it moves along a circular arc extending for about 90 degrees of rotation about the longitudinal axis of the lock barrel in the illustrated example. The 90 degree rotation of the lock barrel 194 between locked and unlocked positions is illustrative only and should not be construed as limiting the scope of the invention. The projection 206 is positioned in a slot 208 provided in the housing 104. The slot 208 is wide enough for the projection 206 to move along its arc-shaped path resulting from the rotation of the lock barrel 194 between locked and unlocked positions without interference from the slot 208. The projections 118 and 120 define an axis of rotation for the handle 102. Therefore, the projection 206 moves along a second arc-shaped path about the axis of rotation R of the handle 102 when the handle 102 is moved pivotally. When the lock barrel 194 is in the locked position and the handle 102 is in the closed position, the projection 206 is positioned so close to one end of slot 208 that movement of the projection 206 along the second arc-shaped path about the axis of rotation R of the handle 102 brings the projection 206 into interference with the end of the slot 208 and thus obstructs the movement of the handle 102 to the open position. When the lock barrel 194 is in the unlocked position and the handle 102 is in the closed position, the projection 206 is positioned farther from the end of the slot 208 such that the projection 206 can now clear the slot 208 and the handle 102 can be moved to the open position, thus allowing the opening of the latch. The first projection 206 extends parallel to the longitudinal axis of the lock barrel 194, and the interference between the slot 208 and the projection 206 tends to impart a shearing force to the projection 206.

The second locking feature is a second projection 210 that is also attached to the locking engagement end of the lock barrel 194. The second projection 210 is also offset relative to the longitudinal axis of the lock barrel such that it moves along a circular arc extending for about 90 degrees of rotation about the longitudinal axis of the lock barrel in the illustrated example. The 90 degree rotation of the lock barrel 194 between locked and unlocked positions is illustrative only and should not be construed as limiting the scope of the invention. The second projection 210 extends substantially perpendicular to the longitudinal axis of the lock barrel 194. As with the projection 206, the projection 210 moves along a second arc-shaped path about the axis of rotation R of the handle 102 when the handle 102 is moved pivotally. The starting point of the arc-shaped path of the projection 210 will vary depending upon whether the lock barrel is in the locked position or in the unlocked position. When the lock barrel 194 is in the locked position and the handle 102 is in the closed position, the projection 210 is positioned such that its arc-shaped path about the axis of rotation R of the handle 102 due to an attempt to rotate the handle 102 from the closed position toward the open position will bring the projection 210 into interference with the housing 104 such that the projection 210 is compressed between the locking engagement end of the lock barrel 194 and the housing 104. Thus the projection 210 obstructs the movement of the handle 102 to the open position when the lock barrel 194 is in the locked position. When the lock barrel 194 is in the unlocked position and the handle 102 is in the closed position, the projection 210 is positioned relative to the housing 104 such that as the projection 210 begins its arc-shaped path about the axis of rotation R of the handle 102 due to an attempt to rotate the handle 102 from the closed position toward the open position, the projection 210 will move away from the housing 104 by virtue of its starting position. Thus, the handle 102 can be moved to the open position without interference from the projection 210 and the latch can be opened.

Figure 28:
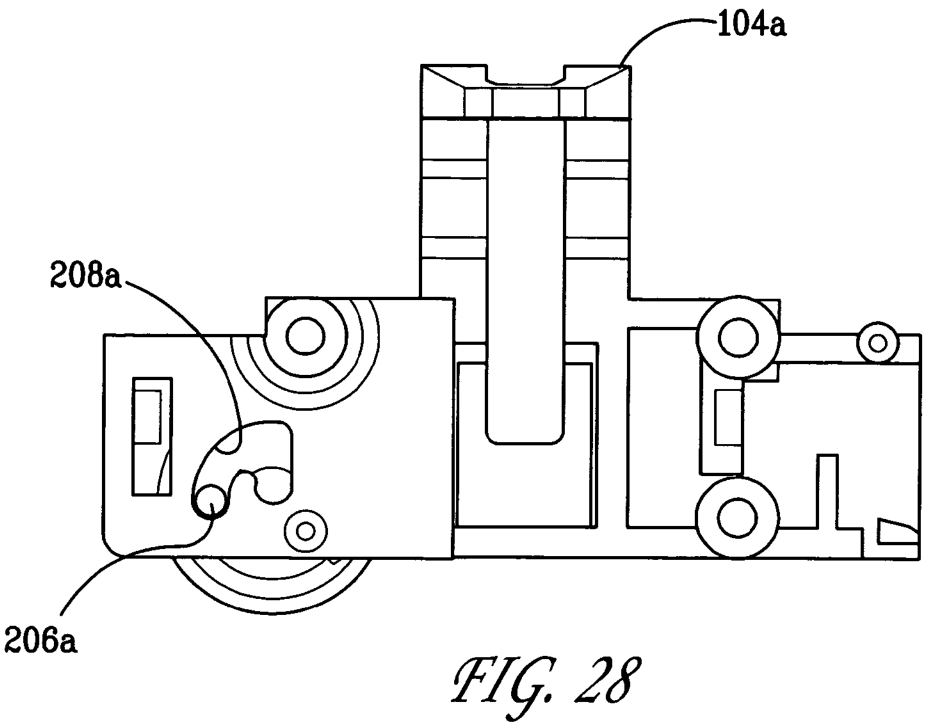
FIGS. 28–29 are views of the second embodiment of the rotary pawl latch with the handle hidden to reveal the lock barrel shown in the locked position.
Figure 29:
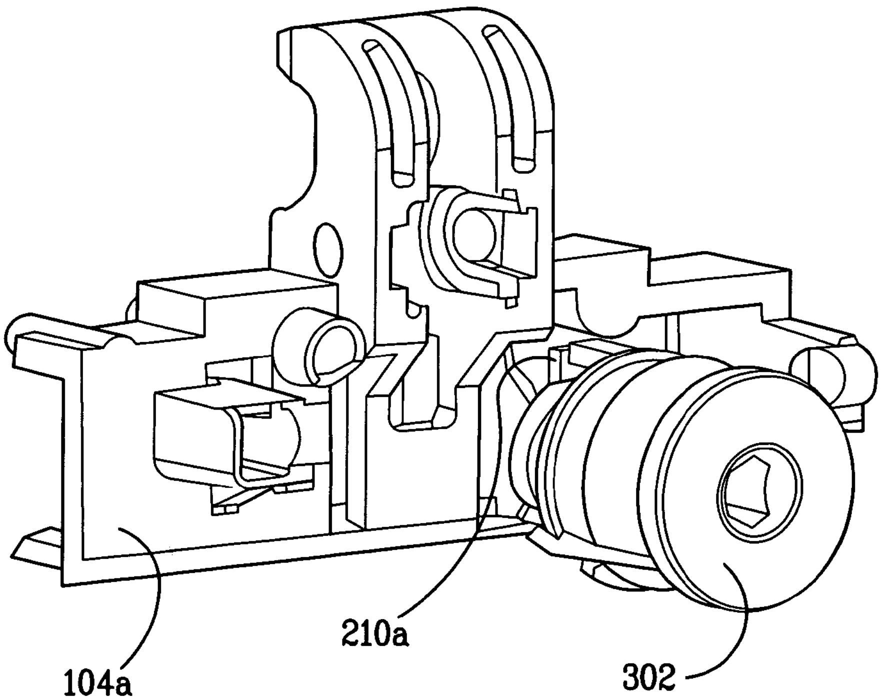
Figure 30:
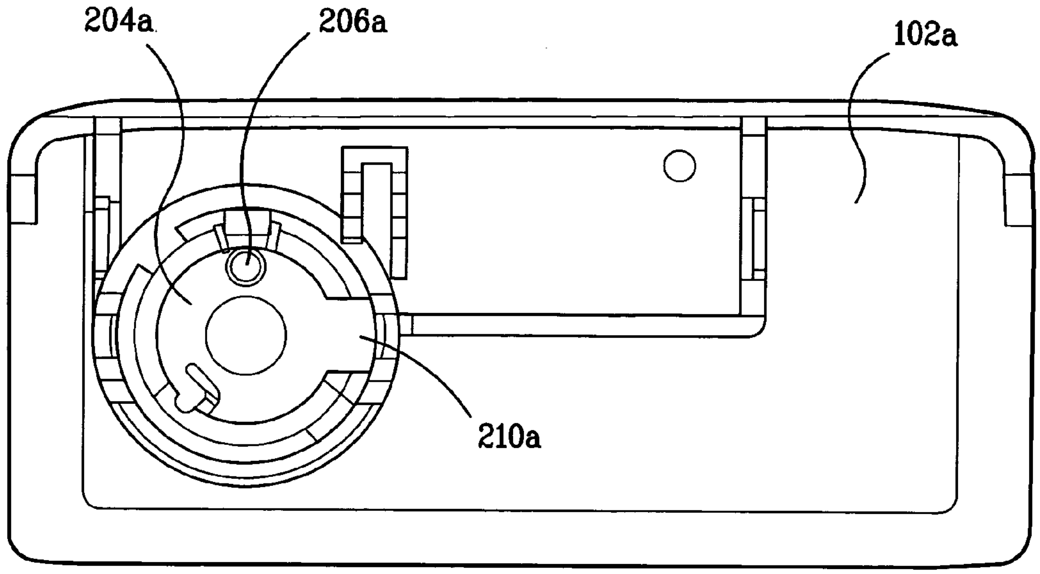
FIG. 30 is a rear view of the handle of the second embodiment of the rotary pawl latch according to the present invention showing the lock barrel assembly in the unlocked position.
Figure 31:
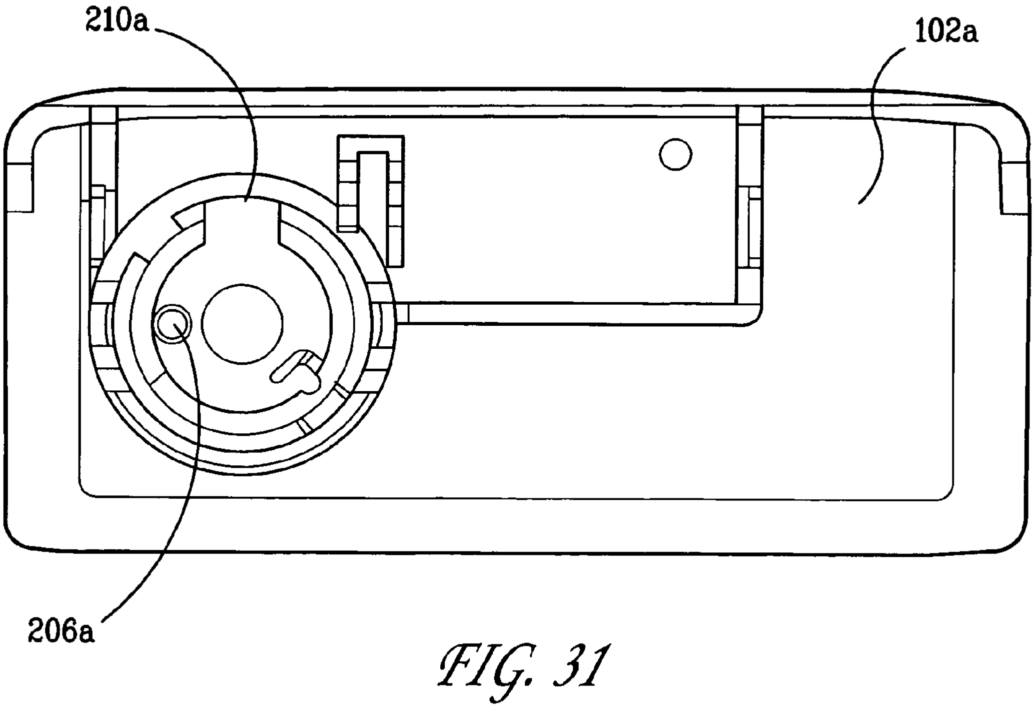
FIG. 31 is a rear view of the handle of the second embodiment of the rotary pawl latch according to the present invention showing the lock barrel assembly in the locked position.
Figure 32:
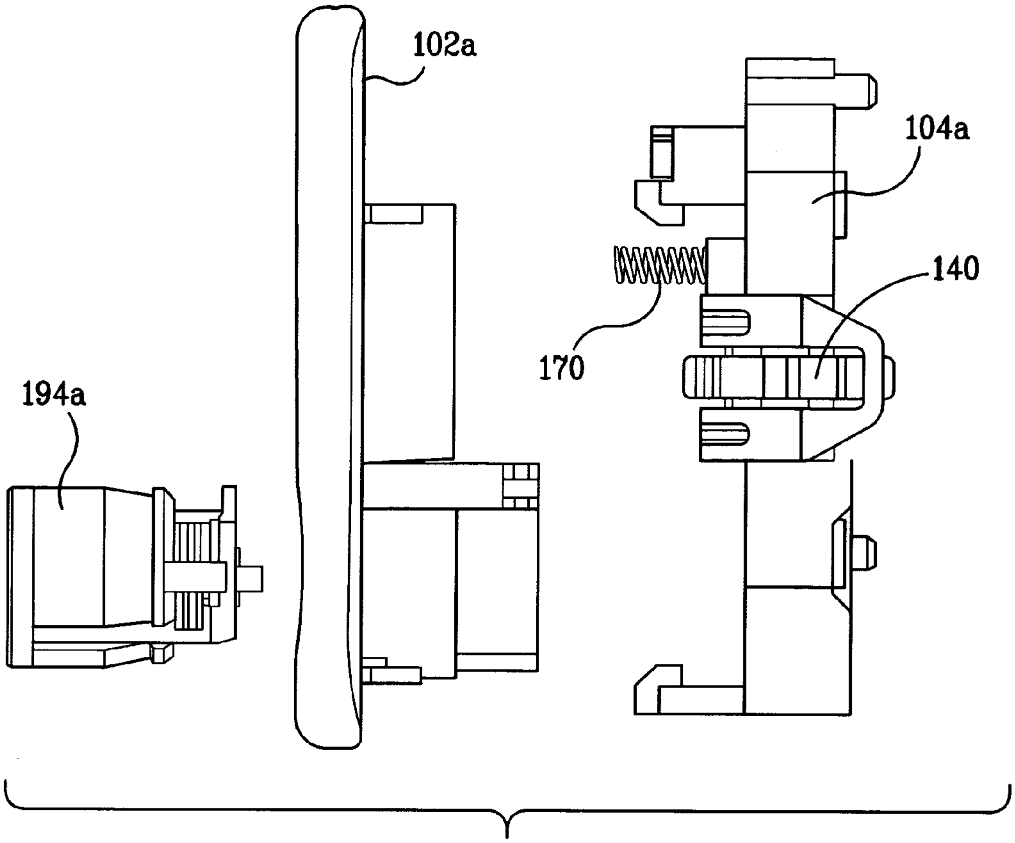
FIGS. 32–35 are partial exploded views of the second embodiment of the rotary pawl latch according to the present invention showing the handle and the lock barrel separated from the rest of the latch.
Figure 33:
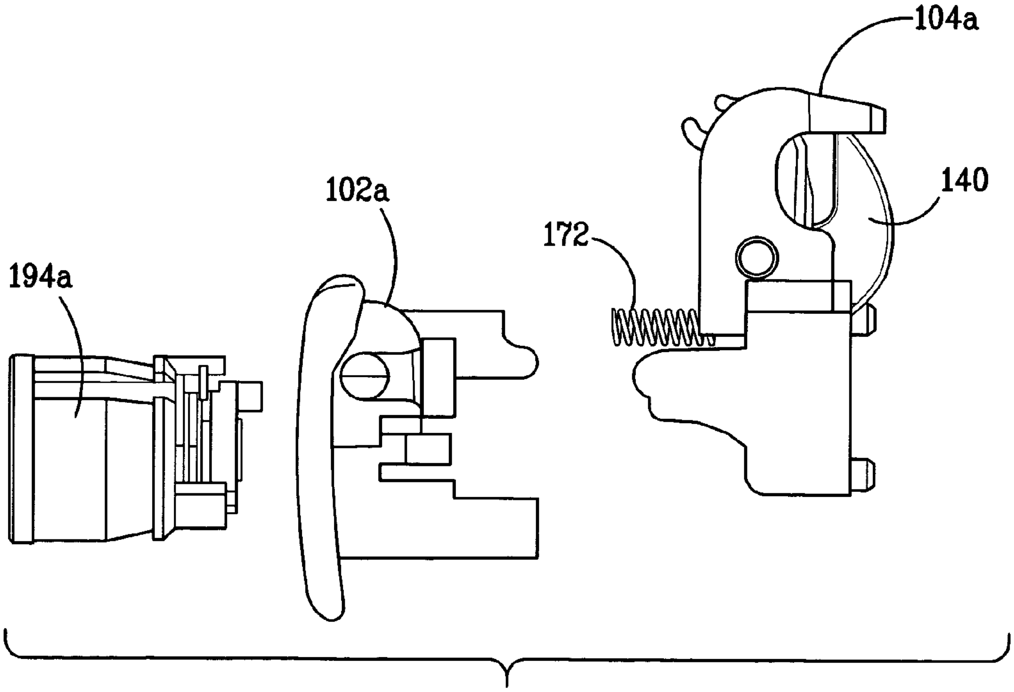
Figure 34:
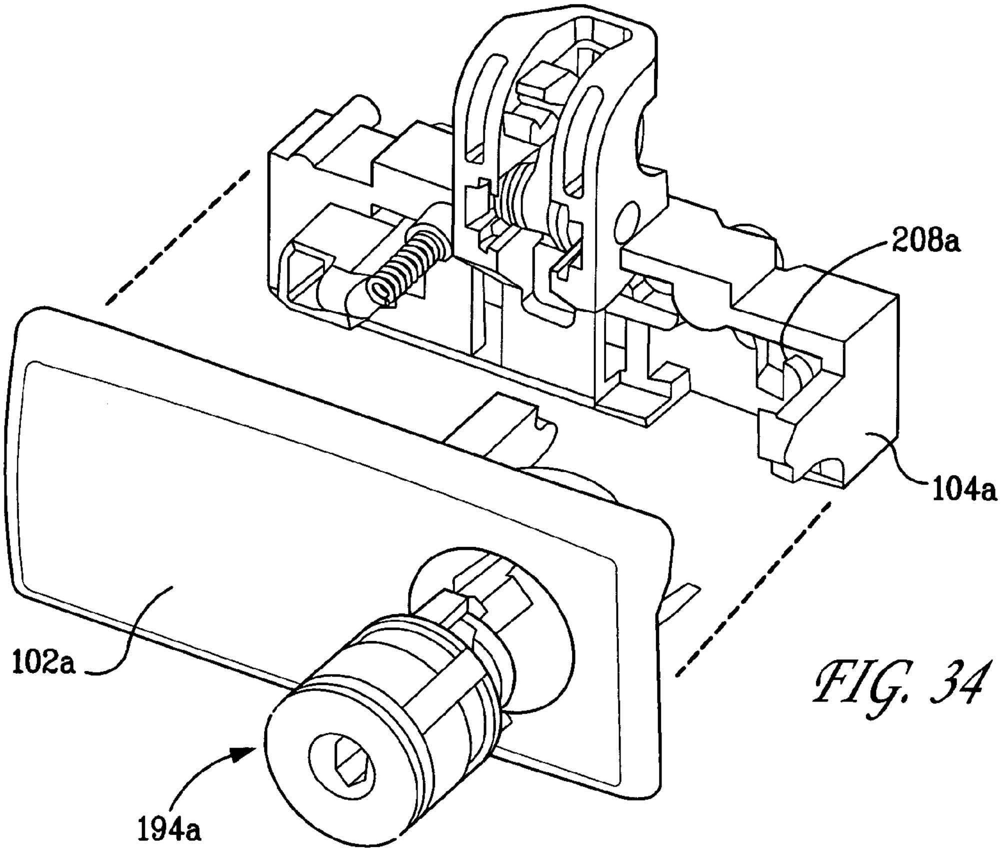
Figure 35:
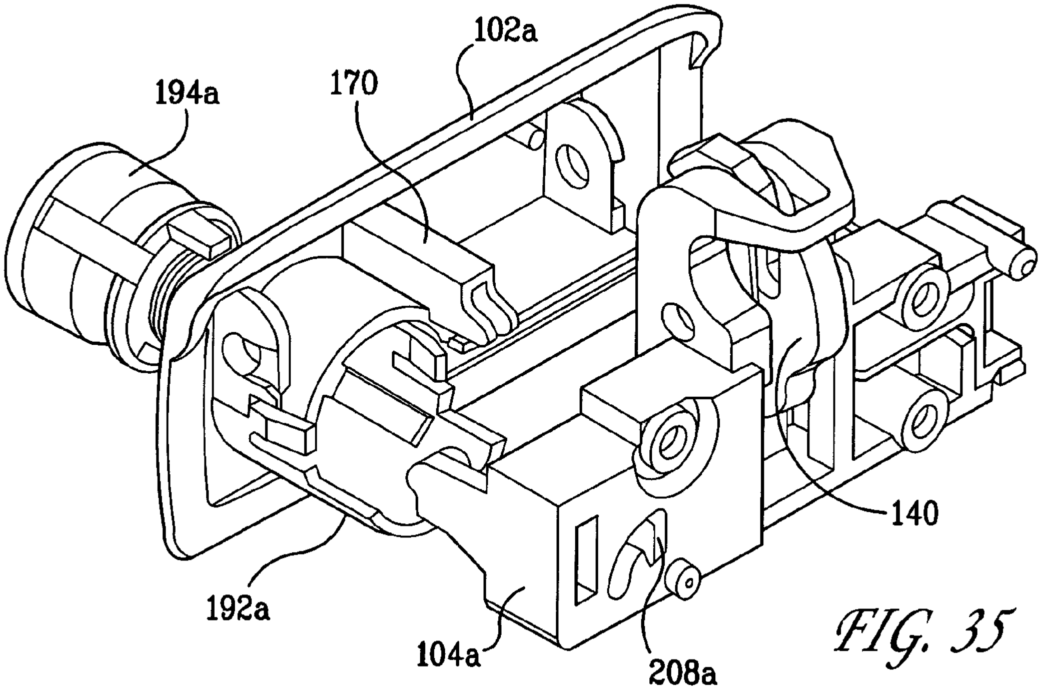
Figure 38:
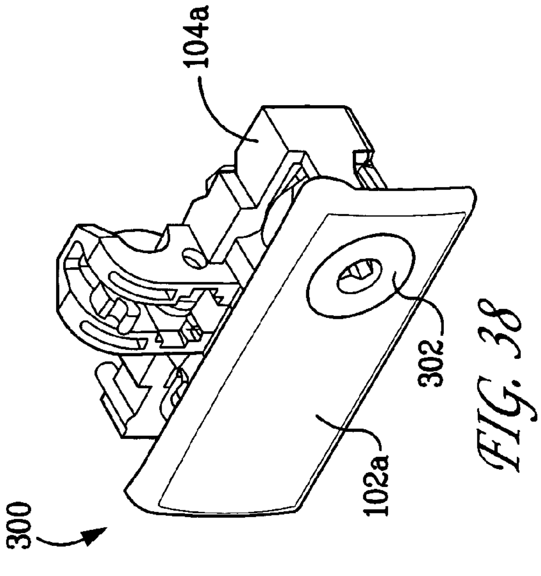
FIGS. 36–40 are views of the rotary pawl latch according to the present invention showing the handle and the pawl in closed positions.
Figure 40:
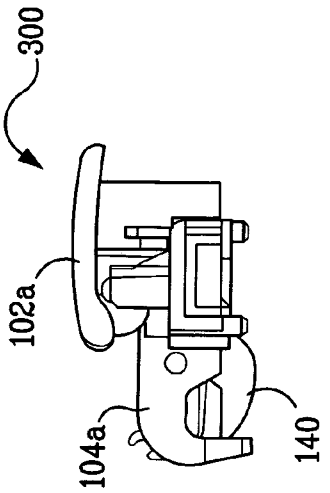
Figure 37:
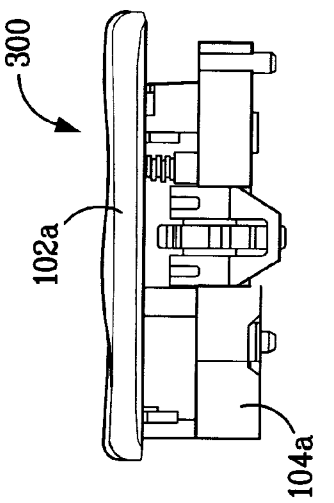
Figure 39:
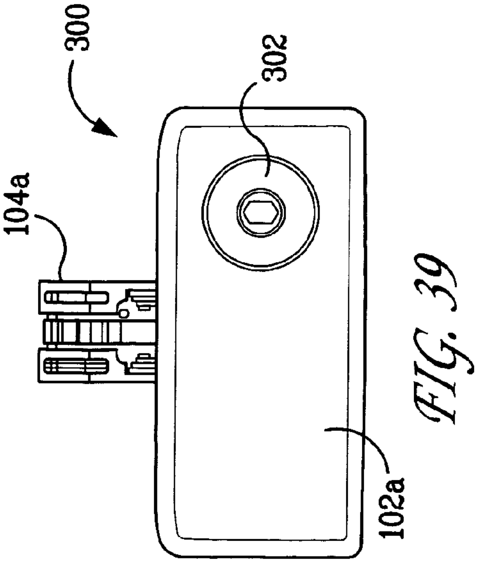
Figure 36:
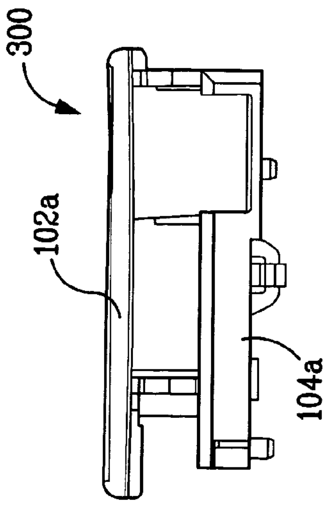

Referring to FIGS. 21–40, a second embodiment 300 of the rotary pawl latch according to the present invention is illustrated. The latch 300 is substantially identical in operation to the latch 100. In the interest of brevity, only the differences between the latch 300 and the latch 100 are described in detail below. Like the latch 100, the latch 300 is provided with means to lock down the handle 102*a* so as to prevent unauthorized access to the compartment secured by the latch 300. This is accomplished by providing a receptacle 192*a* as part of the handle 102*a*. The receptacle 192*a* is adapted to receive a lock barrel assembly 194*a*. The lock barrel assembly 194*a* is adapted for being selectively rotated between locked and unlocked positions by a user using a key. The lock barrel assembly 194*a* can be rotated relative to the receptacle 192*a* using the key between the locked position illustrated in FIGS. 28, 29, and 31 and the unlocked position illustrated in FIG. 30.

In the second embodiment, the lock barrel assembly 194*a* includes the lock barrel 302 and the lock barrel end attachment 204*a*. The lock barrel assembly 194*a* has two locking features for added resistance to tampering, but either feature alone can serve to substantially prevent the opening of the latch so as to provide a useful deterrent to the unauthorized opening of the latch. The two locking features are part of the lock barrel end attachment 204*a*. The lock barrel 302 has a keyhole end 202*a* and a longitudinal axis about which the lock barrel assembly 194*a* is rotated to move the lock barrel assembly between locked and unlocked positions. The lock barrel 302 houses the key actuated mechanism for selective rotation of the lock barrel assembly 194*a* between locked and unlocked positions. The lock barrel end attachment 204*a* is attached to the end of the lock barrel 302 opposite the keyhole end 202*a*, and the lock barrel end attachment 204*a* rotates in response to the rotation of the lock barrel 302. The first locking feature includes a cylindrical projection 206*a* attached to the lock barrel end attachment 204*a* of the lock barrel assembly 194*a*. The first projection 206*a* is offset relative to the longitudinal axis of the lock barrel assembly 194*a* such that it moves along a circular arc extending for about 90 degrees of rotation about the longitudinal axis of the lock barrel assembly in the illustrated example. The 90 degree rotation of the lock barrel assembly 194*a* between locked and unlocked positions is illustrative only and should not be construed as limiting the scope of the invention. The projection 206*a* is positioned in a slot 208*a* provided in the housing 104*a* when the handle 102*a* is in the closed position. The slot 208*a* has an arcuate portion and a straight portion. The width of the slot 208*a* is such that the projection 206*a* can extend therethrough and such that the projection 206*a* can move along the slot 208*a* without interference from the sides of the slot 208*a*. The arcuate (i.e. arc-shaped) portion of the slot 208*a* corresponds to and provides clearance for the arc-shaped path of the projection 206*a* resulting from the rotation of the lock barrel assembly 194*a* between locked and unlocked positions. The projections 118 and 120 define an axis of rotation for the handle 102*a*. Therefore, the projection 206*a* moves along a second arc-shaped path about the axis of rotation R of the handle 102*a* when the handle 102*a* is moved pivotally. When the lock barrel assembly 194*a* is in the locked position and the handle 102*a* is in the closed position, the projection 206*a* is positioned so close to the closed end of the arcuate portion of the slot 208*a* that movement of the projection 206*a* along the second arc-shaped path about the axis of rotation R of the handle 102*a* brings the projection 206*a* into interference with the closed end of the slot 208*a* and thus obstructs the movement of the handle 102*a* to the open position. When the lock barrel assembly 194*a* is in the unlocked position and the handle 102*a* is in the closed position, the projection 206*a* is in registry with the straight portion of the slot 208*a*, which is connected to and in open communication with the arcuate portion of the slot 208*a*. When the lock barrel assembly 194*a* is in the unlocked position and the handle 102*a* is in the closed position, the projection 206*a* is positioned farthest from the closed end of the straight portion of the slot 208*a* such that the projection 206*a* can now clear the closed end of the straight portion of the slot 208*a* without any interference between the projection 206*a* and the slot 208*a*, and the handle 102*a* can be moved to the open position, thus allowing the opening of the latch. The first projection 206*a* extends parallel to the longitudinal axis of the lock barrel assembly 194*a*, and the interference between the closed end of the arcuate portion of the slot 208*a* and the projection 206*a* tends to impart a shearing force to the projection 206*a*.

The second locking feature is a second projection 210*a* that is also part of the lock barrel end attachment 204*a* of the lock barrel assembly 194*a*. The second projection 210*a* is also offset relative to the longitudinal axis of the lock barrel assembly 194*a* such that it moves along a circular arc extending for about 90 degrees of rotation about the longitudinal axis of the lock barrel assembly in the illustrated example. The 90 degree rotation of the lock barrel 194 between locked and unlocked positions is illustrative only and should not be construed as limiting the scope of the invention. The second projection 210*a* extends substantially perpendicular to the longitudinal axis of the lock barrel assembly 194*a*. As with the projection 206*a*, the projection 210*a* moves along a second arc-shaped path about the axis of rotation R of the handle 102*a* when the handle 102*a* is moved pivotally. The starting point of the arc-shaped path of the projection 210*a* will vary depending upon whether the lock barrel assembly is in the locked position or in the unlocked position. When the lock barrel assembly 194*a* is in the locked position and the handle 102*a* is in the closed position, the projection 210*a* is positioned such that its arc-shaped path about the axis of rotation R of the handle 102*a* due to an attempt to rotate the handle 102*a* from the closed position toward the open position will bring the projection 210*a* into interference with the housing 104*a* such that the projection 210*a* is compressed between the disk-like portion 304 of the lock barrel end attachment 204*a* and the housing 104*a*. Thus the projection 210*a* obstructs the movement of the handle 102*a* to the open position when the lock barrel assembly 194*a* is in the locked position. When the lock barrel assembly 194*a* is in the unlocked position and the handle 102*a* is in the closed position, the projection 210*a* is positioned relative to the housing 104*a* such that as the projection 210*a* begins its arc-shaped path about the axis of rotation R of the handle 102*a*, due to an attempt to rotate the handle 102*a* from the closed position toward the open position, the projection 210*a* will move away from the housing 104*a* by virtue of its starting position. Thus, the handle 102*a* can be moved to the open position without interference from the projection 210*a* and the latch can be opened.

In the first embodiment, the projection 210 is spaced more than 90 degrees apart from the projection 206 about the longitudinal axis of the lock barrel. In the second embodiment, the projection 210*a* is spaced approximately 90 degrees apart from the projection 206*a* about the longitudinal axis of the lock barrel assembly. In the second embodiment, the lock barrel assembly 194*a* is mounted off-center in the paddle 102*a* to accommodate the larger diameter and longer length of the lock barrel 302 and thus allow the use of a locking mechanism utilizing the vehicle ignition key. This is in contrast to the smaller centrally located lock barrel 194 of the first embodiment 100. The latch housing 104*a* is extended to one side as compared to the housing 104 to provide the interlocking features for the lock barrel assembly 194*a* to mate with.

In the appended claims the terms "lock barrel" is intended to generically encompass both the lock barrel 194 and the lock barrel assembly 194*a*, unless otherwise specified.

It will be apparent to those skilled in the art that various modifications can be made to the latch of the present invention without departing from the scope and spirit of the invention, and it is intended that the present invention cover modifications and variations of the latch which are within the scope of the appended claims and their equivalents.

What is claimed is:

1. A latch assembly for releasably securing a first member in a closed position relative to a second member, the latch assembly comprising:

a housing adapted for attachment to one of the first member and the second member;

a handle pivotally attached to said housing and being movable between a closed position and an open position, said handle causing the latch assembly to open when said handle is moved to the open position; and a lock barrel assembly supported by said handle, said lock barrel assembly being adapted for being selectively rotated between locked and unlocked positions by a user using a key, said lock barrel assembly having a keyhole end, locking engagement end, and a longitudinal axis about which said lock barrel assembly is rotated to move said lock barrel assembly between locked and unlocked positions, said lock barrel assembly having at least one projection that is positioned to interfere with and substantially prevent the movement of said handle to said open position of said handle by engaging a portion of said housing when said lock barrel assembly is in said locked position, wherein said at least one projection is attached to said locking engagement end of said lock barrel assembly, wherein said at least one projection is offset relative to said longitudinal axis of said lock barrel assembly, and wherein said first projection extends from said locking engagement end of said lock barrel assembly in a direction parallel to said longitudinal axis of said lock barrel assembly and away from said keyhole end of said lock barrel assembly, whereby said lock barrel assembly can be used to selectively lock the latch assembly against opening.

2. The latch assembly according to claim 1, wherein said at least one projection is a first projection and wherein the latch assembly further comprises a second projection attached to said locking engagement end of said lock barrel assembly, said second projection being offset relative to said longitudinal axis of said lock barrel assembly, and said second projection extending substantially perpendicular to said longitudinal axis of said lock barrel assembly, said second projection being positioned such that said second projection obstructs movement of said handle to said open position when said lock barrel assembly is in said locked position.

3. The latch assembly according to claim 1, wherein said at least one projection is cylindrical.

4. The latch assembly according to claim 1, wherein said housing has a slot and wherein said at least one projection is positioned within said slot when said handle is in said closed position.

5. The latch assembly according to claim 4, wherein said at least one projection is positioned within said slot such that movement of said handle from the closed position toward the open position brings said at least one projection into interference with an end of said slot and thus obstructs movement of said handle to said open position, when said lock barrel assembly is in said locked position and said handle is in said closed position.

6. The latch assembly according to claim 5, one of the first member and the second member having a keeper in a fixed positional relationship therewith, wherein said latch assembly further comprises:

a pawl rotationally connected to said housing, said pawl being movable between an open position of said pawl and a closed position of said pawl, said pawl being spring biased toward said open position of said pawl;

a locking member supported by said housing, said locking member being capable of engagement with said pawl to maintain said pawl in said closed position of said pawl; and an actuation arm attached to said handle, said actuation arm engaging and moving said locking member out of engagement with said pawl in response to movement of said handle from said closed position to said open position, said pawl being capable of capturing the keeper to thereby secure the first member in the closed position relative to the second member when the keeper is captured by said pawl with said pawl being in said closed position of said pawl, said locking member engages said pawl to maintain said pawl in said closed position of said pawl, and said handle is in said closed position of said handle.

7. The latch assembly according to claim 6, wherein said at least one projection is cylindrical.

8. The latch assembly according to claim 4, wherein said slot has an arcuate portion and a straight portion, said arcuate portion having a closed end and said straight portion having a closed end, said straight portion of said slot being connected to and in open communication with said arcuate portion of said slot, said arcuate portion of said slot corresponding to an arc-shaped path of said at least one projection resulting from rotation of said lock barrel assembly between said locked and unlocked positions, said at least one projection being positioned proximate said closed end of said arcuate portion of said slot such that movement of said handle from said closed position of said handle to said open position of said handle is prevented due to interference between said at least one projection and said closed end of said arcuate portion of said slot when said lock barrel assembly is in said locked position and said handle is in said closed position, said at least one projection being in registry with said straight portion of said slot when said lock barrel assembly is in said unlocked position and said handle is in said closed position such that said handle can be moved from said closed position of said handle to said open position of said handle without any interference between said at least one projection and said closed end of said straight portion of said slot.

9. The latch assembly according to claim 8, one of the first member and the second member having a keeper in a fixed positional relationship therewith, wherein said latch assembly further comprises:

- a pawl rotationally connected to said housing, said pawl being movable between an open position of said pawl and a closed position of said pawl, said pawl being spring biased toward said open position of said pawl;
- a locking member supported by said housing, said locking member being capable of engagement with said pawl to maintain said pawl in said closed position of said pawl; and
- an actuation arm attached to said handle, said actuation arm engaging and moving said locking member out of engagement with said pawl in response to movement of said handle from said closed position to said open position, said pawl being capable of capturing the keeper to thereby secure the first member in the closed position relative to the second member when the keeper is captured by said pawl with said pawl being in said closed position of said pawl, said locking member engages said pawl to maintain said pawl in said closed position of said pawl, and said handle is in said closed position of said handle.

10. The latch assembly according to claim 9, wherein said at least one projection is cylindrical.

11. The latch assembly according to claim 2, wherein said handle has an axis of rotation, said second projection moving along an arc about the longitudinal axis of the lock barrel assembly as said lock barrel assembly rotates between said locked and unlocked positions, with said lock barrel assembly being positioned in said locked position said second projection is positioned relative to said axis of rotation of said handle such that said second projection tends to move toward said housing in a first direction to thereby push said second projection into interference with said housing when an attempt is made to rotate said handle from said closed position toward said open position to thereby obstruct movement of said handle to said open position when said lock barrel assembly is in said locked position, and

- when said lock barrel assembly is in said unlocked position and said handle is in said closed position, said second projection is positioned relative to said housing such that said second projection will move away from said housing in a second direction substantially opposite said first direction by virtue of a starting position of said second projection relative to said axis of rotation of said handle when said handle is rotated from said closed position toward said open position, to thereby allow said handle to be moved to said open position without interference from said second projection and allow the latch assembly to be opened.

12. The latch assembly according to claim 11, wherein said first projection is cylindrical.

13. The latch assembly according to claim 11, wherein said housing has a slot and wherein said first projection is positioned within said slot when said handle is in said closed position.

14. The latch assembly according to claim 13, wherein said first projection is positioned within said slot such that movement of said handle from the closed position toward the open position brings said first projection into interference with an end of said slot and thus obstructs movement of said handle to said open position, when said lock barrel assembly is in said locked position and said handle is in said closed position.

15. The latch assembly according to claim 14, one of the first member and the second member having a keeper in a fixed positional relationship therewith, wherein said latch assembly further comprises:

- a pawl rotationally connected to said housing, said pawl being movable between an open position of said pawl and a closed position of said pawl, said pawl being spring biased toward said open position of said pawl;
- a locking member supported by said housing, said locking member being capable of engagement with said pawl to maintain said pawl in said closed position of said pawl; and
- an actuation arm attached to said handle, said actuation arm engaging and moving said locking member out of engagement with said pawl in response to movement of said handle from said closed position to said open position, said pawl being capable of capturing the keeper to thereby secure the first member in the closed position relative to the second member when the keeper is captured by said pawl with said pawl being in said closed position of said pawl, said locking member engages said pawl to maintain said pawl in said closed position of said pawl, and said handle is in said closed position of said handle.

16. The latch assembly according to claim 15, wherein said first projection is cylindrical.

17. The latch assembly according to claim 13, wherein said slot has an arcuate portion and a straight portion, said arcuate portion having a closed end and said straight portion having a closed end, said straight portion of said slot being connected to and in open communication with said arcuate portion of said slot, said arcuate portion of said slot corresponding to an arc-shaped path of said first projection resulting from rotation of said lock barrel assembly between said locked and unlocked positions, said first projection being positioned proximate said closed end of said arcuate portion of said slot such that movement of said handle from said closed position of said handle to said open position of said handle is prevented due to interference between said first projection and said closed end of said arcuate portion of said slot when said lock barrel assembly is in said locked position and said handle is in said closed position, said first projection being in registry with said straight portion of said slot when said lock barrel assembly is in said unlocked position and said handle is in said closed position such that said handle can be moved from said closed position of said handle to said open position of said handle without any interference between said first projection and said closed end of said straight portion of said slot.

18. The latch assembly according to claim 17, one of the first member and the second member having a keeper in a fixed positional relationship therewith, wherein said latch assembly further comprises:

a pawl rotationally connected to said housing, said pawl being movable between an open position of said pawl and a closed position of said pawl, said pawl being spring biased toward said open position of said pawl;

a locking member supported by said housing, said locking member being capable of engagement with said pawl to maintain said pawl in said closed position of said pawl; and an actuation arm attached to said handle, said actuation arm engaging and moving said locking member out of engagement with said pawl in response to movement of said handle from said closed position to said open position, said pawl being capable of capturing the keeper to thereby secure the first member in the closed position relative to the second member when the keeper is captured by said pawl with said pawl being in said closed position of said pawl, said locking member engages said pawl to maintain said pawl in said closed position of said pawl, and said handle is in said closed position of said handle.

19. The latch assembly according to claim 18, wherein said first projection is cylindrical.

20. A latch assembly for releasably securing a first member in a closed position relative to a second member, the latch assembly comprising:

a housing adapted for attachment to one of the first member and the second member;

a handle pivotally attached to said housing and being movable between a closed position and an open position, said handle causing the latch assembly to open when said handle is moved to the open position; and a lock barrel assembly supported by said handle, said lock barrel assembly being adapted for being selectively rotated between locked and unlocked positions by a user using a key, said lock barrel assembly having a keyhole end, locking engagement end, and a longitudinal axis about which said lock barrel assembly is rotated to move said lock barrel assembly between locked and unlocked positions, said lock barrel assembly having at least one projection that is positioned to interfere with and substantially prevent the movement of said handle to said open position of said handle when said lock barrel assembly is in said locked position, wherein said at least one projection is attached to said locking engagement end of said lock barrel assembly, wherein said at least one projection is offset relative to said longitudinal axis of said lock barrel assembly, and wherein said at least one projection extends from said locking engagement end of said lock barrel assembly in a direction perpendicular to said longitudinal axis of said lock barrel assembly, whereby said lock barrel assembly can be used to selectively lock the latch assembly against opening, wherein said handle has an axis of rotation, said at least one projection moving along an arc about the longitudinal axis of the lock barrel assembly as said lock barrel assembly rotates between said locked and unlocked positions, with said lock barrel assembly being positioned in said locked position said at least one projection is positioned relative to said axis of rotation of said handle such that said at least one projection tends to move toward said housing in a first direction to thereby push said at least one projection into interference with said housing when an attempt is made to rotate said handle from said closed position toward said open position to thereby obstruct movement of said handle to said open position when said lock barrel assembly is in said locked position, and when said lock barrel assembly is in said unlocked position and said handle is in said closed position, said at least one projection is positioned relative to said housing such that said at least one projection will move away from said housing in a second direction substantially opposite said first direction by virtue of a starting position of said at least one projection relative to said axis of rotation of said handle when said handle is rotated from said closed position toward said open position, to thereby allow said handle to be moved to said open position without interference from said at least one projection and allow the latch assembly to be opened.

21. The latch assembly according to claim 20, one of the first member and the second member having a keeper in a fixed positional relationship therewith, wherein said latch assembly further comprises:

a pawl rotationally connected to said housing, said pawl being movable between an open position of said pawl and a closed position of said pawl, said pawl being spring biased toward said open position of said pawl;

a locking member supported by said housing, said locking member being capable of engagement with said pawl to maintain said pawl in said closed position of said pawl; and an actuation arm attached to said handle, said actuation arm engaging and moving said locking member out of engagement with said pawl in response to movement of said handle from said closed position to said open position, said pawl being capable of capturing the keeper to thereby secure the first member in the closed position relative to the second member when the keeper is captured by said pawl with said pawl being in said closed position of said pawl, said locking member engages said pawl to maintain said pawl in said closed position of said pawl, and said handle is in said closed position of said handle.

* * * * *